UNITED STATES PATENT OFFICE.

EMILE A. FOURNEAUX, OF NEW YORK, N. Y., ASSIGNOR TO HERMAN A. METZ, OF NEW YORK, N. Y.

PROCESS OF MAKING ZINC FORMALDEHYDE HYDROSULFITE, (S.)

No. 814,031.     Specification of Letters Patent.     Patented March 6, 1906.

Application filed May 8, 1905. Serial No. 259,469.

*To all whom it may concern:*

Be it known that I, EMILE A. FOURNEAUX, a citizen of the United States, residing at New York, in the county of New York and State of New York, have invented certain new and useful Improvements in Processes of Making Zinc Formaldehyde Hydrosulfite, of which the following is a specification.

In my copending application, Serial No. 252,867, filed March 30, 1905, I have described and claimed a novel basic zinc formaldehyde hydrosulfite occurring as a white crystalline precipitate having great reducing power and a high degree of stability and believed to correspond substantially to the formula:

$$ZnSO_2.CH_2O.H_2O.$$

In said application I have also described and claimed a method of producing this basic zinc salt, said method consisting in reacting with a suitable alkaline compound, as sodium carbonate, upon a solution of zinc hydrosulfite which has been treated with formaldehyde.

The above method is believed to proceed in accordance with the reaction:

$$2ZnS_2O_4 + 4CH_2O + Na_2CO_3 + 3H_2O = 2ZnSO_2.CH_2O.H_2O + 2NaHSO_3.CH_2O + CO_2,$$

one molecular proportion of the zinc formaldehyde hydrosulfite yielding one molecular proportion of the above-mentioned basic zinc salt and one molecular proportion of alkali formaldehyde bisulfite. This alkali formaldehyde bisulfite remains in the mother-liquor as an expensive by-product having no commercial value.

I have discovered that this basic zinc salt may be obtained in a substantially quantitative manner and without the production of any expensive by-product, thus materially reducing the cost of the salt. This is accomplished by reacting under definite conditions, as hereinafter set forth, with zinc and a suitable acid upon an alkali formaldehyde bisulfite, which may be the by-product of the method described in my prior application above referred to or which may be otherwise prepared.

To avoid confusion of terms, the salts corresponding to the general formula $Me_2S_2O_4$ (Me indicating any univalent metal,) heretofore considered as derived from the hypothetic hydrosulfurous acid of Bernthsen $H_2S_2O_4$ are herein termed "hydrosulfites" in accordance with common usage, and the salts derived from the hypothetic hydrosulfurous acid of Schuetzenberger $H_2SO_2$ are hereinafter referred to as hydrosulfites, (S.)

In preparing the basic zinc formaldehyde hydrosulfite (S) according to my present method I preferably treat a concentrated solution of an alkali formaldehyde bisulfite with equivalent proportions of zinc-dust and a suitable acid, as hydrochloric or sulfuric acid, under the following well-defined conditions: The reaction should take place at a temperature not less than 60° centigrade, preferably between 80° to 90° centigrade. The liquid should be stirred constantly to keep the insoluble matters in suspension, and the acid should be introduced below the surface of the liquid and so slowly that it is never present in the liquid in its free state to any substantial degree. Under these conditions the reaction takes place almost quantitatively as follows:

$$NaHSO_3.CH_2O + Zn + HCl = NaCl + ZnSO_2.CH_2O.H_2O$$

or $$2NaHSO_3.CH_2O + 2Zn + H_2SO_4 = Na_2SO_4 + 2ZnSO_2.CH_2O.H_2O.$$

Example: To five hundred and fifty pounds sodium bisulfite 55° Twaddell add the necessary amount of formaldehyde forty per cent., about one hundred and thirty-five pounds. Then heat gradually to 60° centigrade and add one hundred and twenty pounds zinc-dust pasted with the required amount of hot water. Then raise the temperature to 80° or 90° centigrade and allow the required amount of hydrochloric acid, 27° Twaddell—say two hundred pounds—to run slowly into the above mixture, taking care to introduce the acid under the surface of the liquor. The acid must be added so slowly that it is readily taken up, and the reaction of the liquid on litmus must never be a yellowish red, at most wine color, and there must be no development of hydrogen and no smell of thioformaldehyde, nor must formaldehyde be given off in any considerable quantities. During the entire reaction the liquid must be stirred energetically. After the acid is all introduced the stirring is continued until the reaction of the liquid becomes neutral.

The liquid is then allowed to stand until the zinc salt is entirely separated, so that the mother-liquors no longer or but very slightly reduce a solution of indigo sulfonic acid.

In the above example the hydrochloric acid can be replaced by sulfuric acid—say four hundred and twenty pounds—at 25° Twaddell.

The resulting white crystalline precipitate of basic zinc formaldehyde hydrosolfite (S) is then separated from the mother-liquors by filtration and washed with cold water to remove the sodium chlorid or sulfate formed during the reaction.

I claim—

The process which consists in reacting on an alkali formaldehyde bisulfite with zinc and supplying a suitable acid at such rate that the presence of free acid is substantially avoided, thereby producing basic zinc formaldehyde hydrosulfite (S), substantially as described.

In testimony whereof I affix my signature in presence of two witnesses.

EMILE A. FOURNEAUX.

Witnesses:
PAUL LOESERY,
ALEXANDER SCHWARSMAN.